May 6, 1969  P. P. SZERESZEWSKI ET AL  3,442,259
APPARATUS FOR REGULATING FREE PISTON GAS GENERATORS
Filed Sept. 18, 1967
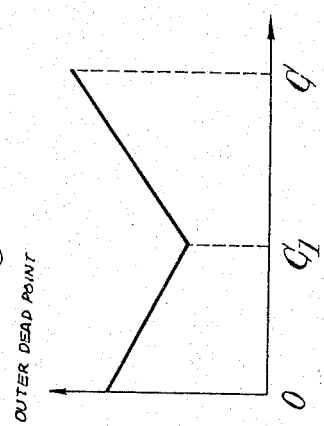
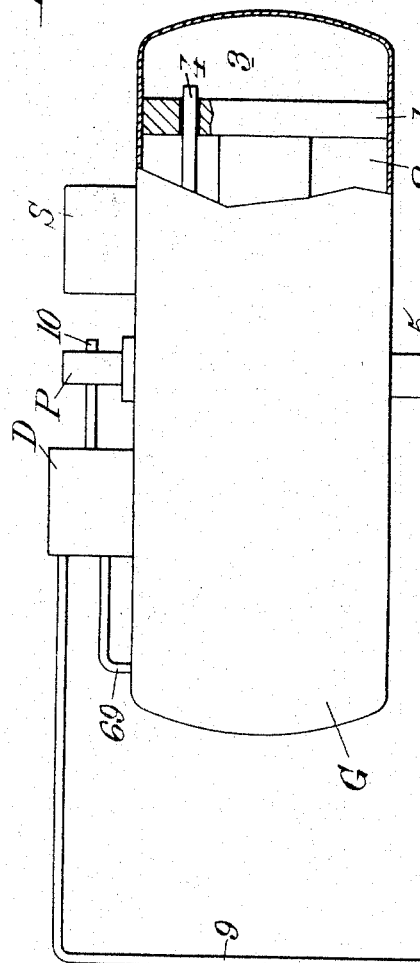
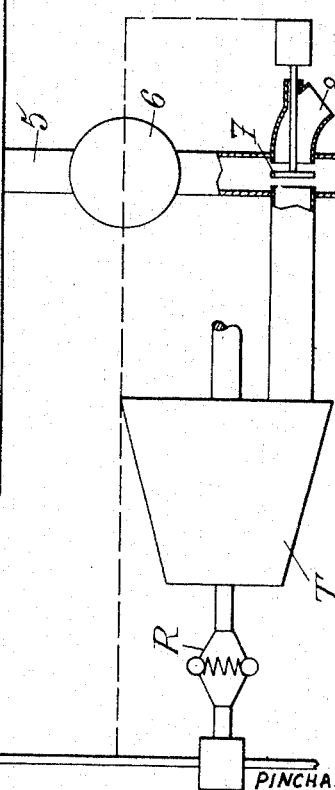
INVENTOR
PINCHAS PAUL SZERESZEWSKI
JEAN-BAPTISTE GUY
BY
Jennings Bailey Jr.
ATTORNEY

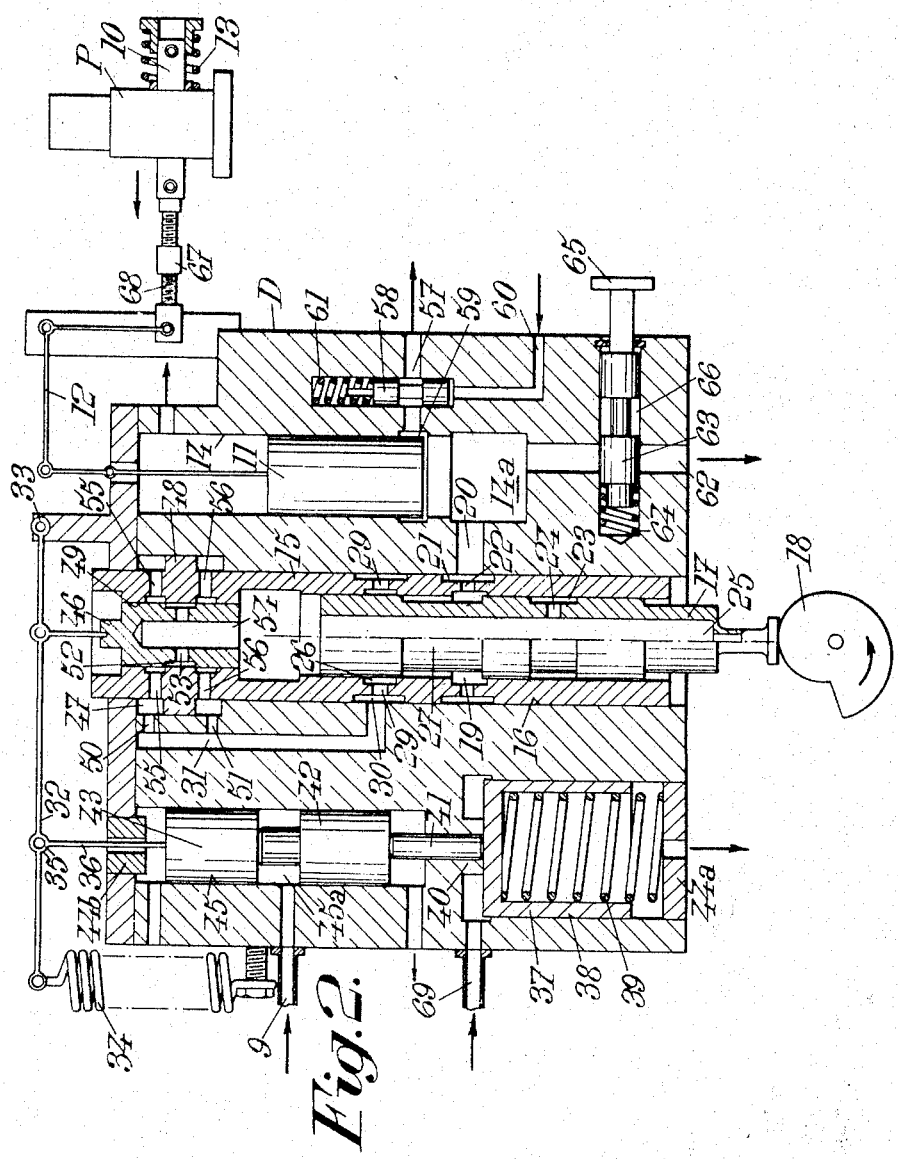

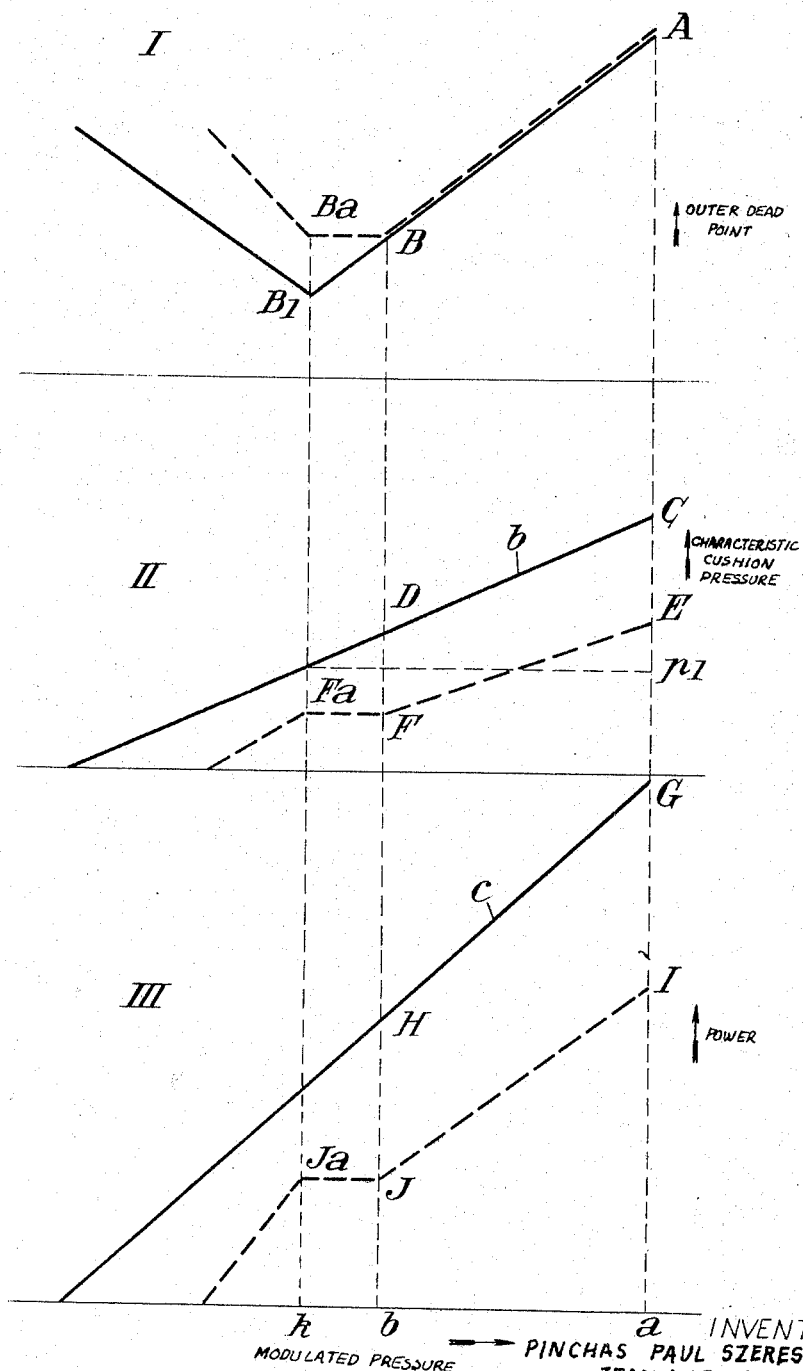

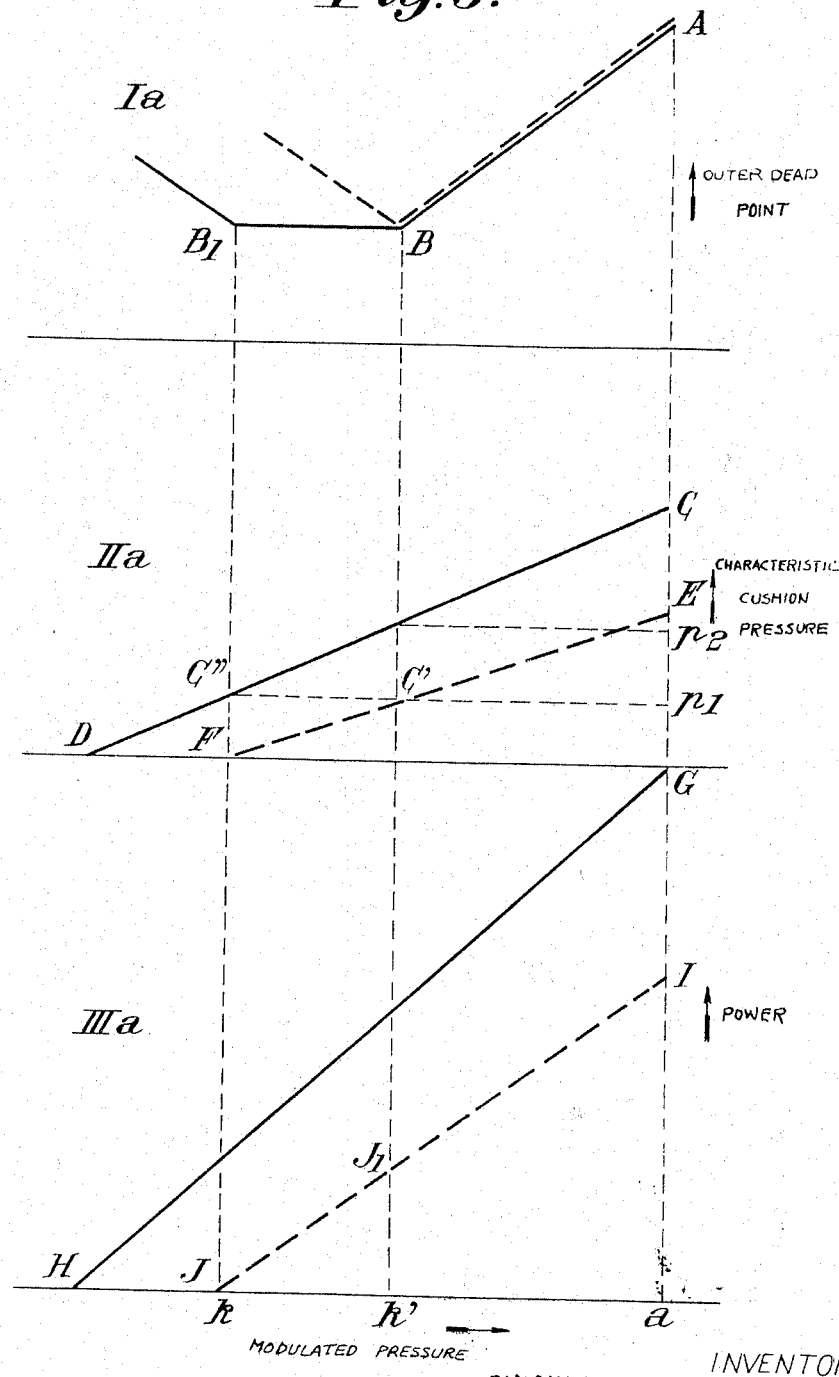

United States Patent Office

3,442,259
Patented May 6, 1969

3,442,259
APPARATUS FOR REGULATING FREE PISTON GAS GENERATORS
Pinchas Paul Szereszewski, Asnieres, and Jean-Baptiste Guy, Lyons, France, assignors to Societe Industrielle Generale de Mecanique Appliquee S.I.G.M.A., Paris, France, a company
Filed Sept. 18, 1967, Ser. No. 668,478
Claims priority, application France, Sept. 21, 1966, 77,184; June 15, 1967, 110,571
Int. Cl. F02b 71/00, 41/10; F02d 39/103
U.S. Cl. 123—46                                24 Claims

ABSTRACT OF THE DISCLOSURE

Apparatus for regulating free piston gas generators as a function of a variable factor related to the load of the gas generator. During the zone of low loads, for which the driven machine can not absorb all the gas generated by the gas generator, as the load increases, the outer dead point of the free piston(s) decreases progressively from its maximum value at no-load to its minimum value at a particular load which may be before or at the boundary between the zone of low loads and the zone of higher loads, and in said zone of higher loads, as the load increases, the outer dead point increases progressively.

---

This invention relates to the regulation of free piston gas generators, that is to say of machines which deliver hot gas under pressure serving to drive a power machine generally formed by a turbine. The invention is more particularly, but not exclusively, concerned with the regulation of gas generators of the type in question in which practically all the energy developed in the motor cylinder, during the outward stroke of the free piston or pistons, is stored in one or more pneumatic accumulators of energy (cushions), whereas this energy is restored to the free piston(s) during the inward stroke during which the combustion air in the motor cylinder is compressed and the scavenging air and the combustion air in the compressor part of the gas generator are also compressed.

One of the characteristics of the free piston gas generators resides in the fact that the outer dead point of the piston or pistons is variable, this variation of the dead point influencing the quantity of gas delivered by the compressor part of the gas generator, and consequently, the quantity of driving gas supplied by this machine.

In United States Patent No. 3,152,441, filed Oct. 15, 1962 in the name Robert Huber for "Power Plants Comprising at Least One Free-piston Engine Generating Gas Under Pressure and a Driven Machine, Such as a Turbine," it has already been proposed to regulate the quantity of the fuel injected into the motor cylinder of a gas generator in a manner such that a determined position of the outer dead point of the free piston or pistons corresponds to a determined load of this machine. According to this patent, the member for regulating the fuel injection pump is actuated by a control liquid which acts in an enclosure on a piston or analogous element which is connected to this regulating member, a variation of the quantity of the liquid in the enclosure causing a modification of the position of the regulating member. According to this patent, the quantity of the control liquid located in the enclosure depends on the one hand, on the quantity of liquid which is sent into the enclosure, this quantity being constant for low loads and variable for higher loads and, on the other hand, on the quantity of liquid which is evacuated out of this enclosure, this latter quantity being a function of the outer dead point. When the quantity of liquid sent into the enclosure undergoes a modification, following a modification of the load of the machine fed with driving gas by the gas generator, the outer dead point undergoes a variation such that the quantity of liquid evacuated becomes again equal to the quantity sent into the enclosure so that a new state of equilibrium is established.

An object of the present invention is to provide regulation of the type in question which responds still better to the considerations of practice.

Instead of leaving the outer dead point fixed for low loads of the plant, that is to say for loads for which a part of the gas compressed by the gas generator can not be absorbed by the driven machine and must be evacuated to the exterior, according to the invention, in the zone of low loads, the outer dead point is progressively reduced as the loads increase, the minimum dead point being the dead point which exists when the evacuation towards the exterior of a part of the gas compressed by the gas generator ceases, whereas, for higher loads, the outer dead point is increased progressively as the load increases.

Preferably, to control the variation of the outer dead point during low loads, one of the pressures of the gas generator is used which varies with load, for example a pressure characteristic of a pneumatic accumulator of energy (cushion).

The reduction of the outer dead point when the load increases, as long as the machine is operating in the zone of low loads, has for its effect to reduce the quantity of gas which it is necessary to allow to escape towards the exterior during this zone, whereby the operation of the machine is more economic. For very low loads nearing the no-load operation, the combustion air has a very low pressure and is, consequently, not very dense. To assure the satisfactory filling of the motor cylinder, it is necessary to achieve a very wide opening of the intake ports of the motor cylinder, which leads to the necessity of displacing the outer dead point relatively far outwards. By contrast, when the loads increase, the pressure and consequently the density of the combustion air increase correspondingly, which permits of reducing the section of the intake ports of the motor cylinder and of displacing the dead point inwards. This inward displacement continues until the minimum dead point is reached. If the load increases after the closing of the valve which controls the escape of a part of the compressed gas towards the exterior, the outer dead point must then be displaced outwards although the density of the combustion air continues to increase, so that the gas generator delivers the required quantity of gas for the higher loads.

The invention comprises, in addition to the above mentioned main feature, other features which are preferable used at the same time but which, in suitable cases, could be applied alone, and which will be described hereafter, In particular:

A second feature relates to the case in which the position of the member for regulating the fuel introduced into the motor cylinder of the gas generator depends on the quantity of the control liquid which, in the above mentioned enclosure, acts on a piston or analogous element connected to this regulating member. This feature comprises rendering at least approximately constant the quantity of control liquid which passes into the enclosure and controlling the port by which this liquid is evacuated out of the enclosure by two members preferably having the form of sliders, one of these two members, is controlled by a factor which determines the desired outer dead point, and this member reduces the port (section and/or duration) of evacuation to cause an increase of the fuel introduced into the gas generator, and consequently, an outward displacement of the outer dead point;

this same member increases this port (section and/or duration) in the reverse case. The other member is controlled as a function of the existing outer dead point and acts, in consequence of the displacement of the outer dead point, on the evacuation port in the opposite sense to bring back the evacuation port to the value which assures the state of equilibrium between the quantities of control liquid which enter and which leave this enclosure. The application of this second feature permits of obtaining with precision the desired outer dead point for each value of the factor which determines the position of the outer dead point.

A third feature also relates to the case in which the position of the member for regulating the fuel introduced into the motor cylinder of the gas generator depends on the quantity of the control liquid which, in the above mentioned enclosure, acts on a piston or analogous element connected to this regulating member. This feature comprises rendering the difference between the pressure of the control liquid upstream of the enclosure (feed pressure) and the pressure in the enclosure equal to the difference between this latter pressure and the pressure downstream of the enclosure (evacuation pressure), which renders the effect of regulation independent of the viscosity of the control liquid.

A fourth feature comprises making the arrival of the control liquid into the enclosure, in which this liquid acts on a piston connected to the member for controlling the fuel, continue on stopping of the gas generator, and arranging a discharge conduit to lead out of this enclosure at a place which corresponds to the position that this piston, and consequently the member for controlling the fuel, should occupy at the moment of starting. A obturator is inserted in this discharge conduit which obturator, in consequence of the stopping of the gas generator, is brought automatically into the position in which it opens the discharge conduit, the pressure of the control liquid thus bringing the piston to the starting position while its continuous flow assures the purge of the regulator, this obturator being closed automatically as soon as the gas generator starts.

A fifth feature comprises providing, on the enclosure in which is located the control liquid which acts on a piston or analogous element connected to the member for regulating the fuel and at a place which is never covered by this piston, a discharge orifice of large section which, normally, is closed by an obturator member and whose opening permits of immediately emptying this enclosure and of bringing back to zero the regulating member, which causes the stopping of the gas generator.

Preferred embodiments of the invention will now be described, merely by way of example, with reference to the accompanying drawings, in which:

FIGURE 1 shows schematically a power plant comprising a free piston gas generator and, as the driven machine, a turbine, driven by the driving gas produced by the gas generator, the regulation of this gas generator being arranged according to the present invention;

FIGURE 2 shows on a large scale, one embodiment of a regulating device according to the present invention;

FIGURE 3 is a diagram indicating the variation, according to one of the features of the invention, of the outer dead point of the gas generator of the plant of FIGURE 1 as a function of the load C of the gas generator;

FIGURE 4 is a diagram corresponding to FIGURE 3; and

FIGURE 5 is a similar diagram relating to another feature of the invention.

The following embodiments will be described with reference to a power plant having one or more free piston gas generators, whose regulation is arranged according to the present invention, feeding a single driven machine such as a turbine.

As for the gas generator or generators of the plant, these are preferably arranged with two opposed free pistons whose movements are synchronized by a known synchronization device.

In FIGURE 1, a gas generator has been shown schematically in elevation, of which only one of the ends is shown in section, permitting of showing one of the compressor pistons 1 which, by its inner face delimits one (2) of the compressor spaces in which is compressed the combustion air and the scavenging air for the motor cylinder of the gas generator, and by its outer face one (3) of the pneumatic accumulators of energy (cushions) of the gas generator. It is in these cushions that practically all the energy developed by the combustion of the fuel injected into the motor cylinder is stored during the outward stroke of the free pistons, this energy serving, during the consecutive inward stroke, to assure, in the compressor cylinders, on the one hand, the compression of the air which has been drawn in during the preceding outward stroke, and on the other hand, the compression of the combustion air in the motor cylinder.

The level of the pressure in the cushions 3 which varies with the load of the gas generator is regulated, in a known manner, by a stabilizer S. In order that the pressures in the cushions, which are located at the two ends of the gas generator, are the same, these cushions communicate, in a known manner, with each other through a tube 4.

The fuel is injected into the motor cylinder of the gas generator towards the end of the inward stroke of the opposed free pistons with the aid of an alternative movement injection pump P whose regulation, according to the invention, will be described later.

The driving gas delivered by the gas generator G leaves by an exhaust pipe 5 which is connected to the exhaust ports of the motor cylinder of the gas generator, and a reservoir 6 is inserted in the exhaust pipe 5. A valve 7 permits of connecting this reservoir either with the intake of a turbine T, or with an exhaust conduit 8, or with the turbine and the exhaust conduit at the same time (position shown in FIG. 1).

In the embodiment of the plant shown schematically by FIG. 1, the turbine T drives a regulator R which, in a known manner, causes the variation, as a function of the turbine load, of the pressure of a fluid, such as oil, in a conduit 9.

It should be noted here that the modulation of the oil pressure in the conduit 9 can be obtained by any other means instead of the regulator R, for example by a control element on which the operator of the plant acts to obtain that the plant supplies a determined power, or by a watt meter regulator connected to the terminals of an alternator driven by the turbine T, or by a pressure regulator or a flow regulator of a compressor or of a pump driven by this turbine, in brief, by any means adapted to indicate the power of the turbine or to impose on it a determined load.

The modulated oil pressure is transmitted to the regulating device D constructed according to the invention, and also acts on the valve 7 in such a manner that, in the zone of low loads, a larger or smaller part of the driving gas delivered by the gas generator G can escape to the exterior by the exhaust conduit 8, whereas, from a medium load and for higher loads, the valve 7 completely closes the exhaust conduit 8 so that all the driving gas produced by the gas generator arrives at the turbine T and serves for its driving.

FIGURE 2 shows, in a detailed manner, the regulating device D arranged according to the invention and permitting of accuring exactly, by the variation of the quality of the fuel injected by the pump P, an outer dead point of the free pistons which only depends on the control factor or factors to which this device is subjected, which are, preferably, factors indicating, at each moment, the power produced or to be produced by the gas generator, whatever the other variable factors are, such as the calorific power of the fuel, the pressure of the driving gas, the ambient pressure, etc., which could have an influence on the outer dead point.

The regulating device D serves to cause the variation of the position of the regulating member 10 of the injection pump P. This member can be formed in any appropriate manner, for example it can be formed, in a known manner, by a rack which causes the piston of the pump P to turn about it axis.

The regulating member 10 is connected, on the one hand, to a piston 11, by the intermediary of a system of rods 12, and on the other hand, to a return spring 13, which tends to displace the regulating member 10 in the sense of a reduction of the quantity of the fuel injected by the pump P during each of its delivery strokes. The piston 11 works in a cylinder 14 formed in the device D and delimits, in the lower part of this cylinder, an enclosure 14a. The position of the piston 11 in the cylinder 14 depends on the quantity of the control liquid, formed for example by oil, which is located in the enclosure 14a and which is subjected, by the spring 13 to a pressure $P_2$. The greater this quantity is, the more the piston 11 is pushed towards the top in opposition to the return spring 13, and the more the rack 10 is displaced in a sense which increases the quantity of the fuel injected by the pump P during each delivery stroke. The reverse takes place when the quantity of the control liquid in the enclosure 14a decreases.

In order to make the quantity of the liquid contained in the enclosure 14a, and consequently the volume of this enclosure, vary, in a manner such that the modification of the quantity of the fuel delivered by the pump P (this modification being the consequence of the variation of the volume of the enclosure 14a) produces a determined modification of the outer dead point, according to one of the features of the present invention, a practically constant quantity of control liquid is made to enter the enclosure 14a during each oscillation (one outward stroke and one inward stroke) of the free pistons, and a certain quantity is evacuated, in the period during which the free pistons are located in the immediate neighborhood of their outer dead point, this certain quantity depending, on the one hand, on a control member whose position is a function of the factor which determines the desired outer dead point, and on the other hand, on a control member whose position is a function of the momentary outer dead point. If a variation of this factor requires an increase of the outer dead point, the control member, actuated by this factor, begins to reduce the quantity of control liquid evacuated from the enclosure 14a, which has for its consequence to increase the volume of this enclosure and to displace the rack 10 in the sense of an increase of the quantity of fuel injected by the pump P. This increase produces an outward displacement of the outer dead point, this displacement, for its part, acting on the other control member actuated by the outer dead point, in the sense of an increase of the quantity of control liquid evacuated, until this quantity is again equal to the quantity which is introduced into this enclosure during each oscillation of the free pistons. When this equilibrium is reached, a new state of equilibrium exists for which the new outer dead point has exactly the position required by the determining factor. Of course, a variation of the determining factor which requires a decrease of the outer dead point has the reverse effect.

It will be understood that, in this regulation, only the determining factor and the outer dead point which is the determined value play a part. If this factor is the power of the gas generator, other factors, such as the calorific value of the fuel in particular, do not play a part which renders the regulation in question of the outer dead point particularly apt for gas generators which should be able to operate with different fuels.

Of course, the feature which has just been described can be realized in different manners. According to a preferred embodiment, the two control members, which act as a function of the variation of the determining factor and the outer dead point, respectively, are made to act on the port through which a part of the control liquid in the enclosure 14a is evacuated immediately before and after the outer dead point.

Thus, according to FIGURE 2, the control member whoes position depends on the determining factor is formed by a hollow slider 15 whose axial position is variable, as a function of this factor, inside a bore 16 which is formed in the device D. According to this same figure, the control member, which acts on the evacuation port as a function of the existing outer dead point, is formed by a slider 17, also hollow, which moves inside the hollow slider 15. This slider 17 accomplishes a to-and-fro movement in synchronism with the free pistons and it is driven, for this purpose, by a cam 18 which is fixed, for example, to the central axle of the mechanism for synchronizing the free pistons. The slider 17 effects an upward movement when the free pistons pass from the inner dead point to the outer dead point, and a downward movement in the reverse case. The contour of this cam is such that it pushes this slider 17 as much higher as the outer dead point is displaced further outwards.

The enclosure 14a constantly communicates with a groove 19 formed inside the hollow slider 15 through a channel 20, a groove 21 formed in the outer surface of the slider 15 and openings 22 which connect the outer groove 21 to the inner groove 19.

The evacuation of the liquid from the enclosure 14a is controlled by the cooperation of the inner groove 19 of the slider 15 with an outer groove 23 of the slider 17, this later groove communicating, by one or more openings 24, with the inside of the slider 17 and through this inside, with a space where the ambient pressure regins.

In FIGURE 2, the cam 18 has the positioin which corresponds to the inner dead point of the free pistons. When these pistons move from their inner dead point towards their outer dead point, the cam turns in the direction indicated by the arrow. When the pistons approach their outer dead point, the upper edge of the groove 23 of the slider 17 passes the lower edge of the groove 19 of the slider 15 and, in this manner, an opening is opened through which a part of the liquid contained in the enclosure 14a can flow towards the exterior. The maximum section of this opening and the duration during which it is unblocked depend, on the one hand, on the position of this slider 15, and on the other hand, on the momentary outer dead point.

With regard to the feeding of the enclosure 14a with control liquid, the quantity of this liquid which enters the enclosure 14a between two consecutive outer dead points should be maintained at least approximately constant with the aid of any appropriate device. According to a preferred embodiment, which is shown in FIGURE 2, the liquid which enters the enclosure 14a is also controlled by the cooperation of the sliders 15 and 17. For this purpose, a second groove 26 is provided inside the slider 15, and a second groove 27 is provided on the outer surface of the slider 17. Moreover, the groove 26 is arranged to communicate constantly, by the intermediary of openings 29 and an outer groove 30, with a feed channel 31 which is connected to the source of control liquid. The communication between the grooves 26 and 19, by the intermediary of the grooves 27, takes place on the outward and inward strokes of the free pistons during periods which are located between the inner dead point and the outer dead point and whose duration is not influenced by a displacement of these dead points and is thus practically constant, which assures the feed of the enclosure 14a by a constant quantity of control liquid. Each period of communication extends, when the slider 17 moves upwardly, between the moment when the upper edge of the groove 27 passes the lower edge of the groove 26 and the moment when the lower edge of the groove 27 reaches the upper edge of the groove 19. For the downward movement of the slider 17, the beginning and the end of each period of communication are determined in an analogous manner.

When the hollow slider 15 is displaced towards the top, by means which will be described later on, under the influence of the factor which determines the outer dead point, this displacement has, as long as the outer dead point has not undergone a corresponding modification, the effect of reducing the section of the opening through which the control liquid can escape from the enclosure 14a and of reducing at the same time the duration during which this opeing is unblocked. Consequently, the quantity of control liquid which enters the enclosure 14a is greater than the quantity which leaves this enclosure, which makes the piston 11 move upwards in its cylinder 14 to displace the rack 10 in the sense which increases the injection of the fuel. This increase of the injection of the fuel causes an outer displacement of the outer dead point, which makes the slider 17 move further upwards inside the slider 15 until the moment when the section of the opening through which a part of the control liquid escapes out of the enclosure 14a and the duration for which this opening remains open have reached their previous value for which there is equality between the quantity of control liquid which enters the enclosure 14a and the quantity which leaves this enclosure during one complete oscillation of the free pistons. A new state of equilibrium is thus reached for which the outer dead point has a value which is determined by the determining factor which caused the upward movement of the slider 15.

Of course, the phenomena take place in a reverse manner if the factor which determines the outer dead point requires a reduction of the outer dead point and thus makes the hollow slider 15 move downwards in its bore 16.

To avoid that a variation of the viscosity of the control liquid can have an influence on the regulation of the control liquid can have an influence on the regulation of the outer dead point, according to another feature of the invention, the pressure $P_1$, which the control liquid has upstream of the enclosure 14a, and the pressure $P_2$ of this liquid in the enclosure (this latter pressure being determined by the force of the return spring 13 and the section of the piston 11), are given values such that their difference is equal to the difference between this pressure $P_2$ and the pressure $P_3$ which reigns during the evacuation of the liquid out of the enclosure downstream of this enclosure. In other words, in order to render the regulating device independent of possible variations of the viscosity of the control liquid, it is arranged that the relation $P_1-P_2=P_2-P_3$ is present. When $P_3$ is the ambient pressure (as is the case for the device shown in FIGURE 2), this pressure thus becomes zero, which leads to the equation $P_1=2P_2$ or $P_2=P_1/2$.

Following the feature in question, an equality is thus obtained between the ΔPs' of the charges and discharges of the enclosure 14a, which eliminates the effect of a variation of the viscosity.

In order to render the value $P_2$ practically independent of momentary position of the pistons 11 in the cylinder 14, hence of the quantity of injected fuel, it is convenient to give the spring 13 a small rigidity so that the force exerted by this spring practically does not vary for the different positions of the rack 10.

With regard to the factor whose variation determines a corresponding variation of the outer dead point, it can be very varied in nature. Also, the law according to which this factor varies can be any law whatsoever.

According to an important feature of the present invention, the load of the gas generator is chosen as the factor which determines the outer dead point, and the law according to which the variation of this load determines the variation of the outer dead point is chosen in a manner such that, in the zone of low loads of the gas generator, that is to say in the zone for which a part of the gas compressed by the gas generator escapes through the valve 7 and the conduit 8 towards the exterior, the increase of the load produces a reduction of the outer dead point and a decrease of the load produces an increase of the outer dead point, whereas, for the zone of higher loads of the gas generator, that is to say for the zone of loads for which the driven machine absorbs all the compressed gas produced by the gas generator (conduit 8 closed by the valve 7), an increase of the load causes the outer dead point to increase in a known manner and a decrease of the load produces a reduction of the outer dead point.

This law is shown in FIGURE 3 in which the loads are indicated by the abscissa and the outer dead point by the ordinate. It can be seen that in the zone of low loads which extends from the point O to the point $C_1$, the outer dead point decreases, whereas in the zone of loads higher than $C_1$, the outer dead point increases with the load.

The physical magnitude which represents the loads in the zone of low loads is, preferably, one of the pressure of the gas generator, for example a pressure which is characteristic for the level of the pressures in the cushion 3 (such a pressure being for example the average pressure in the cushion), whereas, the physical magnitude which represents the loads in the zone of higher loads is preferably the modulated pressure which reigns in the conduit 9.

So that the movements of the slider 15 permit of realizing the law as a function of loads as explained above and shown in FIGURE 3, it is thus necessary that this slider 15, in the zone of low loads, that is to say, in the zone extending from the load O up to the load $C_1$, moves downwards in its bore 16 and that it moves back up again when the loads become greater than $C_1$.

It is evident that numerous devices can be imagined for achieving these movements of the slider 15. A device which seems to be particularly advantageous for this purpose is shown in FIGURE 2. This device comprises a lever 32 adapted to turn about a fixed axle 33 and subjected to the action of a spring 34. The rotation of the lever 32 in the clockwise direction produces an upward movement of the slider 15 in its bore, whereas the rotation of the lever 32 in the counter clockwise direction makes this slider move downwards in its bore. It should furthermore be noted that this spring 34 has a tendancy to make the lever 32 turn in this latter direction. In addition, a rod 36 acts on the lever 32, at a point 35 situated between its axle 33 and its end to which the spring 34 is attached. The rod 36 connects the lever 32 to two systems both actuated by forces variable with the load but having opposed effects on the lever 32 and the spring 34 which acts on this lever, so that the movements of the lever 32 are determined by the one of these systems which exerts the greater force.

The first system is formed by a piston 37 movable in a cylinder 38 and subjected, on one of its sides, to the action of a spring 39, and on its other side, to the pressure characteristic of the cushion, for example, to the average pressure of the cushion brought to the cylinder 38, above the piston 37, by a conduit 69. The force of the spring 39 is transmitted to the lever 32 by the intermediary of a push rod 41, a two-stage floating piston 42, a second piston 43 (the pistons 42 and 43 also form part of the second system) and the rod 36.

The second system comprises, as already mentioned, the two pistons 42 and 43 which are displaceable in a bore 45 and which delimit between themselves a space 45a which is annular as long as the stage of smaller diameter of the piston 42 is applied against the piston 43. In this space 45a opens out the conduit 9 which contains the modulated oil whose pressure varies wtih the load of the turbine T.

The operation of these two systems is the following:

As long as the average pressure of the cushion is zero or very small (power of the gas generator zero or very small), the spring 39 pushes the piston 37 into its highest position determined by its application against a stop 40 in opposition to the spring 34 which is thus stretched.

The lever 32 is thus brought, for the beginning of the zone of low loads, into a position for which the slider 15 has, with respect to this zone of low loads, its highest position for which, consequently, the outer dead point is a maximum for this same zone of loads. Progressively as the loads of this zone of low loads increase, the characteristic pressure of the cushion increases and pushes the pitson 37 progressively in its cylinder 38 towards the bottom, which permits the spring 34 to contract and to make the lever 32 turn in the counter clockwise direction. The slider 15 moves downwards in a corresponding manner in its bore 16 and thus reduces the outer dead point progressively as the load, in this zone of low loads, increases. Up to the load $C_1$, the modulated oil pressure in the space 45a, which also increases with the load, has no effect on the regulation, and the piston 42 remains applied, by the intermediary of the stage of reduced diameter, against the piston 43, and these pistons follow the downward movement of the piston 37. However, if the load continues to increase, the modulated oil pressure becomes predominant, separates the piston 43 from the piston 42, makes the piston 43 move upwards in the bore 45 and thus drives the lever 32 in the clockwise direction while stretching the spring 34. From this moment, any increase of the modulated oil pressure, that is to say any increase of the load in the zone of higher loads, causes the slider 15 to move back up again, and consequently causes an outward displacement of the outer dead point, this displacement being all the greater as the loads, in this zone of higher loads, increase more. This accounts for the rising branch of the curve shown in FIGURE 3.

A stop 44a, at the lower end of the cylinder 38, limits in any case the downward movement of the piston 37 and thus determines the minimum position of the outer dead point, whereas a stop 44b limits the upward movement of the piston 43, and thus determines the maximum position of the outer dead point.

Evidently, the lever 32 could be connected directly to the slider 15. However, to avoid any other reaction on the lever which is in equilibrium under the action of the forces which are transmitted to it by the rod 36 and the spring 34, it is preferable to use the lever 32 for the control of a small slider 46 which controls a servo-motor force for producing the displacement of the slider 15. Advantageously, the control liquid which arrives by the conduit 31 is used as the servo-motor fluid which acts in a cylinder 47 on a piston 48 which is connected to the slider 15. The slider 46 is then disposed in a bore 49 provided in the upper part of the slider 15. By channels 50 and 51, the control liquid arrives on the two sides of the piston 48. The slider 46 comprises a groove 52 which, by orifices 53 and a blind hole 54 provided in this slider, is in communication with the inside of the hollow slider 15, this inside communicating, through the intermediary of the slider 17, with the atmosphere. Finally, the bore 49, in which the slider 46 is located, communicates with the inside of the cylinder 47, on both sides of the piston 48, by channels 55 and 56.

In the position shown in FIGURE 2, the slider 46 closes the two channels 55 and 56 so that the hollow slider 15 is stopped in the position shown. If the slider 46 now undergoes an upward movement, following a rotation of the lever 32 in the clockwise direction, the liquid which is located in the cylinder 47 above the piston 48 can escape through the groove 52 and the orifices 53, so that the pressure above the piston 48 decreases and so that the pressure of the control liquid which acts on the bottom of the piston 48 causes the hollow slider 15 to move back up again until the slider 46 again closes the two channels 55 and 56. In the case in which the rod 32 makes the slider 46 move downwards in its bore 49, the hollow slider 15, under the pressure of the control liquid, accomplishes a corresponding downward movement.

To assure correct starting of the gas generator, it is necessary, on the one hand, that the regulator is well purged, and on the other hand, that the rack 10 is located in a determined position which is not necessarily the position which it should occupy during no-load operation. To achieve these two conditions, the control liquid is made to arrive at the enclosure 14a a little before the starting when the gas generator is still stopped, and a discharge conduit 57 is provided leading out of this enclosure at a place which corresponds to the position that the piston 11 and the rack 10 should occupy at the moment of the starting. A slider 58 is inserted in the discharge conduit 57, this slider 58 closing, when the gas generator is in operation, the discharge conduit 57 but, during stopping of the gas generator, being automatically brought back into the position for which it opens the discharge conduit 57. The result is that, on the one hand, the circulation of the control liquid through the regular which begins before the starting, assures, at the moment of starting, the purge of the regulator, that is to say impedes the formation of air pockets in the liquid circuits of the regulator, and on the other hand, brings and maintains the piston 11 in the position for which it partially opens the mouth of the discharge conduit 57 in the cylinder 14, this mouth being formed for example by a groove 59. The piston 11 stops in a position for which the pressure of the control liquid in the enclosure 14a (this pressure being determined by the degree of opening of the groove 59), just balances the force exerted on the piston 11 by the spring 13. To regulate the exact position of the rack 10 for starting, there is provided, in the system of rods 12, a regulating member 67 permitting the length of the rod 68 to be varied, this rod forming part of this system of rods.

The arrival of the liquid into the enclosure 14a before the starting of the gas generator is permitted by the fact that when the free pistons of the gas generator are in the starting position, into which they are automatically brought, in a known manner, as a consequence of the stopping of the gas generator, the slider 17 is located in the position for which it permits the communication between the conduit 31, through which the control liquid arrives, and the enclosure 14.

Of course, after the first starting stroke, the regulator should begin its normal action. For this, it is necessary to bring the slider 58 into the position for which it closes the conduit 57. This closing can be obtained by connecting the bottom of the slider 58, through a conduit 60, to the cushions of the gas generator in which the air compression takes place from the first oscillation of the free pistons. This pressure, which acts on the slider 58 in opposition to a return spring 61, pushes the slider 58 towards the top, which produces the closing of the discharge conduit 57. Another possibility of bringing the slider 58 into the position of opening at the moment of stopping the gas generator and into its closing position when the gas generator begins to operate would be to use the oil pressure which manifests itself as a consequence of the stopping of the generator, whereas this oil pressure disappears at the moment of starting of the generator so that the return spring 61 could bring the slider in its position of closing.

Finally, according to still another feature of the invention, the immediate stopping of the gas generator can be assured by discharging the enclosure 14a. For this purpose, a discharge channel 62 is provided on this enclosure at a place which is never covered by the piston 11. The discharge channel 62 is of large section and is normally closed by the obturator-slider 63 under the action of a spring 64. This obturator-slider 63 is provided at the outside of the regulator device, with a button 65 so that the operator of the plant can bring this slider, against the action of the spring 64, into a position for which the groove 66 of the obturator-slider is located opposite the channel 62. The control liquid which is located in the enclosure 14a is thus immediately evacuated and the spring 13 immediately brings the rack 10 into the position for which the injection of the fuel is stopped.

Needless to say, various modifications of the apparatus described above are possible such as obtaining the regulation of the outer dead point by a variable feed of the enclosure 14a as a function of the factor which determines the outer dead point and by a constant evacuation of the control liquid out of this enclosure.

As long as the variations of the operating pressure (or of the pressure characteristic of the cushion), of the modulated pressure and of the load are connected by a determined law, that is to say as long as the number of gas generators in service is fixed, the two systems described above control well the variation of the outer dead point as indicated above, this variation of the outer dead point being represented, as a function of the modulated pressure, by the continuous line in part I of FIGURE 4 which corresponds to the line of FIGURE 3.

It can be seen that in the zone of low loads, that is to say, in the zone in which the first system of the regulation device shown by FIGURE 2 is predominant, the outer dead point decreases when the load of the driven machine, and with it, the modulated pressure, increase, until its minimum value is reached at point $B_1$ which corresponds to a characteristic pressure $p_1$ of the cushion and to a modulated pressure $k$, this latter pressure assuring the closing of the valve that permits the escape of a part of the driving gas delivered by the gas generator or gas generators. From the moment when the modulation pressure is equal to or greater than $k$, it is the second system which becomes predominant and which produces a constant increase of the outer dead point which reaches its maximum value A for the maximum modulated pressure $a$ which corresponds to the maximum load (or power) of the driven machine.

At the same time as the outer dead point varies according to the bent continuous line of part I of FIGURE 4, the characteristic pressure of the cushion (part II of FIGURE 4) and the power of the plant (part III of FIGURE 4) vary according to the straight lines $b$ and $c$. There exists in the entire operating range an unambiguous relationship between the operating pressure, the power and the modulated pressure. The operation of the plant is thus satisfactory. However, this satisfactory operation is no longer assured when the number of gas generators in service for feeding the same driven machine is variable. To explain this, the three parts I, II and III of FIGURE 4 show, by dashed lines, the modifications of the outer dead point, of the characteristic pressure of the cushion and of the load (or power) of the driven machine which are produced if, in the plant in which for a total number $n$ of gas generators in service, the values of the outer dead point, of the characteristic pressure of the cushion and of the load (or power) vary according to the continuous lines of FIGURE 4, the number of gas generators in service is reduced to $n-1$.

For the maximum load of the installation having only $n-1$ gas generators in service, the modulated pressure is, as in the previous case, equal to $a$. By contrast, the cushion pressure and the power of the plant are, for $n-1$ gas generators in service, lower than those obtained with $n$ gas generators in service. The outer dead point has, for the maximum operating conditions of the plant operating with a reduced number of gas generators, the same value A as in the case of operation with all the gas generators, this outer dead point depending solely on the modulated pressure. By contrast, the power and the cushion pressure depend on the gas pressure at the intake of the turbine driven by this gas. This pressure depends, for its part, on the flow of the gas delivered by the combination of all the gas generators in service, this flow being as much more reduced as the number of gas generators in service is smaller.

By decreasing progressively the modulated pressure below the value $a$, the three values of the outer dead point, the cushion pressure and the power decrease. Although the outer dead point follows, for a certain time, the same line for $n$ generators and $n-1$ generators, this is not the same for the two other values which follow, from values designated respectively by E and I, lower lines indicated by the dashed lines. This phenomenon continues until the moment when, in the device shown in FIGURE 2, the piston 43 meets the projection of the piston 42. This meeting takes place, for example, at the point B of the dashed line indicating the variation of the outer dead point, this point B corresponding to the modulated pressure $b$, to the cushion pressure F, which is lower than the cushion pressure D which existed for the modulated pressure $b$ when all the gas generators were in service, and to the load J lower than the load H which the plant developed working with all the gas generators for the modulated pressure $b$.

If the modulated pressure is described further, below $b$, with the plant working with $n-1$, gas generators in service, nothing happens until the moment when the modulated pressure reaches the value $k$ for which the escape valve begins to open allow the surplus of the gas produced to escape. Between the modulated pressures $b$ and $k$, the values of the outer dead point, of the cushion pressure and of the power remain constant. Since the modulated pressure is lower than $b$, this modulated pressure tries to decrease the outer dead point to a value lower than that indicated by the point B, but the cushion pressure opposes such a reduction of the outer dead point by the intermediary of the piston 42 and the spring 39 of FIGURE 2.

When the modulated pressure descends below the value $k$, the magnitude of the outer dead point increases from the value B$a$ which is equal to B and the cushion pressure and the load decrease respectively from $Fa=F$ and $Ja=J$.

There results from the foregoing that, in the case considered, there is a horizontal portion in the curve representing the law according to which the power of the plant, working with $n-1$ gas generators in service, varies as a function of the modulated pressure, which is incompatible with satisfactory operation of the plant, for in this case, there is no longer, over the entire operating range, an unambiguous relationship between the power and the modulated pressure.

A feature of this invention is to permit this disadvantage to be mitigated, and to permit satisfactory operation of the plant, not only with all the gas generators in service, but also with a reduced number of gas generators in service.

This feature consists, on the one hand, in regulating the device which determines the outer dead point, not on the basis of the operation of the plant with all the gas generators in service, but on the basis of the operation of the plant with the minimum number of gas generators in service, that is to say in determining, for this latter case, the modulated pressure which is produced by the regulator of the driven machine at the moment when the pressure of the driving gas has reached the value for which the plant operating with the minimum number of gas generators passes from the zone of low loads, during which a surplus of gas should be able to escape, to the zone of higher loads or vice versa, and in arranging the two systems of the regulating device (FIGURE 2) operating in opposed directions in a manner such that it is for this gas pressure and this modulated pressure that one of the two systems becomes predominant with respect to the other, this modulated pressure assuring at the same time the closing (when the load increases) or the opening (when the load decreases) of the valve which, in the zone of low loads, permits the escape of the surplus of the driving gas, and on the other hand, in providing a stop which stops the movement, in the sense of the reduction of the outer dead point, of the first system of the said regulating device as soon as the pressure of the driving gas has reached the above mentioned value.

FIGURE 5 shows, in the form of diagrams analogous to the diagrams of FIGURE 4, that a plant arranged according to this feature of the present invention operates in a satisfactory manner when the number of gas generators in service is variable.

FIGURE 5 comprises, like FIGURE 4, three parts designated respectively by Ia, IIa, IIIa in which the variation of the three values of the outer dead point, the cushion pressure and the power have been represented as a function of the modulated pressure. The continuous lines represent the variation of these three values for the case where all the gas generators are in service, whereas the dashed lines represent the variation of these same values for the case where the number of gas generators in service is minimum.

The two systems operating in opposed directions of the device which determines the outer dead point (FIGURE 2) are arranged in such a manner that the first system comprising the piston 37 is predominant as long as the quantity of gas produced by the gas generators of the installation operating with the minimum number of gas generators is greater than the quantity of gas which can be absorbed by the driven machine. In other words, this first system of the device which determines the outer dead point predominates as long as the characteristic pressure of the cushion of the gas generators, which is a function of the operating pressure of these gas generators, is lower than the value $p_1$ (see part II of FIGURE 5). By contrast, the second system of the device which determines the outer dead point is predominant when the modulated pressure is greater than the value $k'$ which corresponds to the pressure $p_1$ when the plant operates with the minimum number of gas generators in service. It is the modulated pressure $k'$ which closes, when the modulated pressure increases, and which opens, when this pressure decreases, the valve which allows a part of the driving gas delivered by the gas generators to escape.

Finally, the device which determines the outer dead point comprises a stop formed, for example, by a plate 44a whose position is preferably adjustable by screwing and against which the piston 37 is applied as soon as the characteristic pressure of the cushion has reached the value $p_1$.

The operation of the device which determines the outer dead point is, as is shown by the dashed lines of FIGURE 5, for the operation with the minimum number of gas generators in service, exactly the same as that indicated by FIGURE 4 for the operation of the plant when all the gas generators are in service.

In the case where the minimum number of gas generators is in service, the outer dead point (see part I of FIGURE 5) decreases from the no load operation until the moment when the pressure of the gas produced by the gas generators reaches the value which corresponds to the cushion pressure $p_1$ (point C' of the line E–F). At this moment, the outer dead point has its minimum value indicated by the letter B and the power has the value $J_1$. Then, if the power and the delivery pressures increase, on the one hand, the valve which allows the surplus gas to escape closes because the modulated pressure exceeds the value $k'$ and on the other hand, the outer dead point, under the influence of the increase of the modulated pressure, increases according to the line B–A of part Ia of FIGURE 5 since the second system of the device which determines the outer dead point is predominant as soon as the modulated pressure is greater than $k'$.

It results from parts IIa and IIIa of FIGURE 5 that, for the case envisaged, that is to say for the case in which the number of gas generators in service is minimum, the cushion pressure is variable as a function of the modulated pressure according to a straight line E–F and the power of the turbine is variable according to a straight line I–J.

If the plant works with all the gas generators, the outer dead point, the characteristic pressure of the cushion and the load of the driven machine vary as a function of the modulated pressure according to the continuous lines of the three parts of FIGURE 5.

In this case, the characteristic pressure $p_1$ in the cushion is reached at the point C'' of the line C–D which represents the variation of the cushion pressure, this point corresponding to the modulated pressure $k<k'$. It is at this moment that the piston 37 of the first system of the device which determines the outer dead point is applied against the stop 44a and remains in this position for all the values of the cushion pressure greater than $p_1$. The device which determines the outer dead point can thus not reduce this outer dead point below the value $B_1$ which is equal to B, but it can not yet increase the outer dead point either, since $k<k'$. In other words, the outer dead point remains unchanged until the moment when the second system of the device which determines the outer dead point becomes predominant. This is the case at the moment when the modulated pressure reaches $k'$ which corresponds, in the case in which the plant works with all the gas generators, to a cushion pressure $p_2$. At this moment, the second system becomes predominant and the outer dead point begins to increase (see point B of part Ia of FIGURE 5). The fact that the valve, which allows the surplus driving gas to escape, remains open until point B is reached corresponding to the modulated pressure $k'$, permits of assuring a progressive and continuous regulation of the load and of the cushion pressure by varying the degree of opening of the valve by the intermediary of the modulated pressure.

When the plant is working with a number of gas generators lower than the total number but greater than the minimum number, the point where the outer dead point reaches its minimum value is located on the line $B_1$–B between the ends of this line, but the normal operation of the plant is always assured.

In a general manner, while a practical and efficient embodiment of the present invention has been disclosed in the above description, the invention should not be limited thereto as there might be changes made in the arrangement, disposition and form of the parts without departing from the principle of the invention.

What we claim is:

1. Regulating apparatus for regulating the outer dead point of a piston of a free piston gas generator by regulating the quantity of fuel delivered to said gas generator as a function of at least one chosen variable factor which is regulated to the load on said gas generator, said regulating apparatus comprising:

a first system responsive to one of said factors and to the actual outer dead point for controlling the fuel delivery during a zone of low loads during which some of the gas generated by said gas generator is exhausted to the atmosphere, said first system being adapted, as said load increases in at least part of said zone of low loads, to regulate the fuel delivery in such a manner that the outer dead point of the free piston is reduced, and vice versa, and a second system responsive to one of said factors and to the actual outer dead point for controlling the fuel delivery during a zone of higher loads during which the exhaust of gas to the atmosphere is cut off, said second system being adapted, as said load increases in said zone of higher loads, to regulate the fuel delivery in such a manner that the outer dead point of the free piston is increased, and vice versa.

2. Regulating apparatus according to claim 1 in which said factor is represented, in said zone of low loads, by a pressure which is generated in said gas generator.

3. Regulating apparatus according to claim 2 in which a pneumatic energy accumulator cooperates with said free piston, said pneumatic energy accumulator receiving and storing energy from said free piston as said free piston moves from its inner dead point to its outer dead point, and restoring energy to said free piston as said free piston moves from its outer dead point to its inner dead point, a characteristic pressure in said pneumatic energy accumulator being said pressure which represents said factor in said zone of low loads.

4. Regulating apparatus according to claim 1 comprising
a regulating member connected to fuel delivery means provided in said gas generator, the position of said regulating member controlling said fuel delivery means,
an enclosure having inlet and outlet means for a control liquid,
a movable element disposed in said enclosure and adapted to be acted on by said control liquid, the quantity of control liquid in the enclosure determining the position of said element, and said element being connected to said regulating member to control the position of said regulating member,
inlet control means for controlling said inlet means adapted to maintain constant the quantity of control liquid which enters said enclosure during each oscillation of said free piston,
and outlet control means for controlling said outlet means, said outlet control means being responsive to one of said factors and to the actual outer dead point to control, as a function of said factor and of the actual outer dead point, the quantity of control liquid which leaves said enclosure during each oscillation of said free piston.

5. Regulating apparatus according to claim 4 in which a transmission element is operatively connected to said outlet control means for controlling said outlet control means, and resilient biasing means are connected to said transmission element for biasing said transmission element in a direction corresponding to a reduction of the outer dead point of said free piston,
said first system being adapted to act on said transmission element in opposition to said biasing means during at least part of said zone of low loads, but the action of said first system on said transmission element being progressively reduced as the load increases in said part of said zone of low loads, and vice versa,
and said second system being adapted to act on said transmission element in opposition to said biasing means, in predominance over said first system, during said zone of higher loads, the action of said second system on said transmission element progressively increasing as said load increases in said zone of higher loads, and vice versa.

6. Regulating apparatus according to claim 5 in which said transmission element comprises a lever, and said biasing means comprises a first spring, said lever being pivotable about a fixed point, and said spring being connected to one end of said lever,
said first system and said second system acting on said lever at a point disposed between said point and said end of said lever,
said first system acting on said lever by the intermediary of elements comprised by said second system,
said first system comprising a first piston which is under the action of a second spring acting in opposition to said first spring, and which is also under the action of pressure variable with the load of the gas generator, said pressure acting in the same sense as said first spring,
and said second system comprising a second piston connected directly to said lever, and a third piston which is floating and has two stages, one of said stages being adjacent to and of smaller diameter than said second piston whereby to leave an interval between said second and third pistons, a modulated pressure, whose magnitude depends on the load, acting in said interval and producing movement of said second piston and hence of said lever, in opposition to the bias of said first spring, during the zone of higher loads.

7. Regulating apparatus according to claim 5 in which at least one stop is provided for limiting, in at least one direction, the movement which can be imposed on said tranmission element by said systems.

8. Regulating apparatus according to claim 5 in which said control means are indirectly responsive to said factor by the intermediary of servo-motor means,
said servo-motor means comprising the control liquid upstream of said enclosure, and a slider connected to and actuated by said transmission element.

9. Regulating apparatus according to claim 5 wherein the action of said first system is reduced by a pressure which is generated in said gas generator and which increases when the load of said generator increases and vice versa, and wherein the action of the second system is increased by a pressure which is genrated by a machine driven by the gas produced by said gas generator.

10. Regulating apparatus according to claim 9 for use in a power plant comprising a plurality of gas generators of which a variable number can be put in service to deliver gas to a common driven machine, and load determining means connected to said driven machine for producing a modulated pressure representative of the load, said modulated pressure controlling a valve having at least one open position in which it allows some gas compressed by said free piston gas generator to exhaust to the atmosphere, and a closed position in which it cuts off the exhaust of gas to the atmosphere, said modulated pressure having a threshold value below which it opens said valve and above which it closes said valve, said threshold value corresponding for a minimum number of gas generators in service to the threshold between the zone of low loads in which said driven machine cannot absorb all the generated gas and the zone of higher loads in which said driven machine can absorb all the generated gas,
said first system and said second system being adjusted so that said first system is predominant in said zone of low load, and said second system is predominant for said zone of higher loads,
said first system being provided with a stop adapted to limit the action of said first system, in the sense of the reduction of the outer dead point, as soon as the pressure of the gas delivered has reached the value corresponding to the pressure which this gas has with a minimum number of gas generators in service at said threshold value.

11. Regulating apparatus according to claim 1 in which said factor is represented, in said zone of higher load, by a pressure which is generated by a machine driven by the gas produced by said gas generator.

12. Regulating apparatus according to claim 1 for regulating the outer dead point of a piston of a free piston gas generator comprising a delivery pipe for delivering gas generated by said gas generator to a machine adapted to be driven by said gas, said delivery pipe being provided with a valve having at least one open position in which it allows some of said generated gas to exhaust to the atmosphere, and a closed position in which it cuts off the exhaust of said generated gas to the atmosphere, said open position of said valve corresponding to said zone of low loads and said closed position of said valve corresponding to said zone of higher loads.

13. Regulating apparatus according to claim 1 for regulating the outer dead point of a piston of a free piston gas generator connected to a turbine to deliver gas generated by said gas generator to said turbine for driving said turbine.

14. Regulating apparatus for regulating the outer dead point of a free piston of a free piston gas generator by regulating the quantity of fuel delivered by fuel delivery means to said gas generator as a function of at least one chosen variable factor which is related to the operating condition of said gas generator, said regulating apparatus comprising:

a regulating member connected to said fuel delivery means adapted to control by its position said fuel delivery means, an enclosure having inlet and outlet means for a control liquid, a movable element disposed in said enclosure and adapted to be acted on by said control liquid, the quantity of control liquid in the enclosure determining the position of said element, and said element being connected to said regulating member to control the position of said regulating member, inlet control means for controlling said inlet means adapted to maintain constant the quantity of control liquid which enters said enclosure during each oscillation of said free piston, and outlet control means for controlling said outlet means, said outlet control means being responsive to one of said factors and to the actual outer dead point to control, as a function of said factor and of the outer dead point, the quantity of control liquid which leaves said enclosure during each oscillation of said free piston.

15. Regulating apparatus according to claim 14, in which said outlet control means comprises a first member and a second member whose positions control said outlet means, the position of said first member being controlled by said factor, and the position of said second member being controlled by the actual outer dead point reached during each oscillation of the free piston.

16. Regulating apparatus according to claim 15 in which said first member and said second member each comprise a slider.

17. Regulating apparatus according to claim 16 in which each of said sliders is hollow, and one of said sliders is disposed inside the other, said outlet means for said control liquid comprising cooperating grooves provided respectively on the inner surface of the outer slider and on the outer surface of the inner slider, means being provided for driving one of said sliders in an axial to-and-fro movement in synchronism with said free piston whereby one of the dead points of this slider corresponds to the outer dead point of the free piston, and means being provided for driving the other of said sliders in an axial movement whose amplitude depends on the magnitude of the variation of said factor.

18. Regulating apparatus according to claim 14 in which said outlet control means are indirectly responsive to said factor by the intermediary of servo-motor means.

19. Regulating apparatus according to claim 18 in which said servo-motor means comprise the control liquid upstream of said enclosure.

20. Regulating apparatus according to claim 14 in which the difference between the pressure of said control liquid upstream of said enclosure and the pressure of said control liquid in said enclosure is equal to the difference between the pressure of said control liquid in said enclosure and the pressure of said control liquid in said enclosure and the pressure of said control liquid downstream of said enclosure, whereby the regulation is independent of the viscosity of the control liquid.

21. Regulating apparatus according to claim 14 in which said enclosure is provided with a discharge conduit, for said control liquid, at a place corresponding to the position which said movable element should occupy during starting of said gas generator, an obturator being inserted in said discharge conduit, which obturator, in consequence of stopping of said gas generator, is automatically brought into a position in which it opens said discharge conduit, and in which means are provided for bringing some of said control liquid into said enclosure before starting of said gas generator, whereby the pressure of this control liquid brings and maintains said movable element in its starting position, this control liquid, by its flow, purging the regulating apparatus, said discharge conduit being automatically closed as soon as the gas generator starts.

22. Regulating apparatus according to claim 21 in which said obturator is under the influence of a spring tending to bring said obturator to a position in which it opens said discharge conduit, and said obturator is also under the influence of a pressure in said gas generator, which pressure tends to bring said obturator to a position in which it closes said discharge conduit.

23. Regulating apparatus according to claim 21 for regulating the outer dead point of a piston of a free piston gas generator in which a pneumatic energy accumulator cooperates with said free piston, said pneumatic energy accumulator receiving and storing energy from said free piston as said free piston moves from its inner dead point to its outer dead point, and restoring energy to said free piston as said free piston moves from its outer dead point to its inner dead point, the pressure in said pneumatic energy accumulator being said pressure which acts on said obturator tending to close said discharge conduit.

24. Regulating apparatus according to claim 14 in which said enclosure is provided, at a place which is never covered by said movable element, with a large section discharge orifice, an obturator member being provided for narmally blocking off said discharge orifice, said obturator member being capable of opening said discharge orifice for rapidly emptying said enclosure.

References Cited

UNITED STATES PATENTS

| 2,447,352 | 8/1948 | Meitzler | 123—46 |
| 2,531,331 | 11/1950 | Garday | 123—46 |
| 2,823,653 | 2/1958 | Dildine | 123—46 |
| 3,146,765 | 9/1964 | Bush | 123—46 |
| 3,335,640 | 8/1967 | Conrad | 123—46 X |

ROBERT M. WALKER, *Primary Examiner.*

LEONARD H. GERIN, *Assistant Examiner.*

U.S. Cl. X.R.

60—13